(12) United States Patent
Melanson et al.

(10) Patent No.: US 8,212,493 B2
(45) Date of Patent: Jul. 3, 2012

(54) LOW ENERGY TRANSFER MODE FOR AUXILIARY POWER SUPPLY OPERATION IN A CASCADED SWITCHING POWER CONVERTER

(75) Inventors: John L. Melanson, Austin, TX (US);
Mauro L. Gaetano, Austin, TX (US);
Eric King, Dripping Springs, TX (US);
Robert Grisamore, Austin, TX (US);
Zhaohui He, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 386 days.

(21) Appl. No.: 12/495,720

(22) Filed: Jun. 30, 2009

(65) Prior Publication Data
US 2010/0327765 A1 Dec. 30, 2010

(51) Int. Cl.
*H05B 41/36* (2006.01)
*H02M 3/335* (2006.01)

(52) U.S. Cl. .......................................... 315/247; 363/16
(58) Field of Classification Search .................. 315/247, 315/291; 363/16, 24, 25, 26, 64
See application file for complete search history.

(56) References Cited

U.S. PATENT DOCUMENTS

| | | | |
|---|---|---|---|
| 3,316,495 A | 4/1967 | Sherer | |
| 3,423,689 A | 1/1969 | Miller et al. | |
| 3,586,988 A | 6/1971 | Weekes | |
| 3,725,804 A | 4/1973 | Langan | |
| 3,790,878 A | 2/1974 | Brokaw | |
| 3,881,167 A | 4/1975 | Pelton et al. | |
| 4,075,701 A | 2/1978 | Hofmann | |
| 4,334,250 A | 6/1982 | Theus | |
| 4,409,476 A | 10/1983 | Lofgren et al. | |
| 4,414,493 A | 11/1983 | Henrich | |
| 4,476,706 A | 10/1984 | Hadden et al. | |
| 4,523,128 A | 6/1985 | Stamm | |
| 4,677,366 A | 6/1987 | Wilkinson et al. | |
| 4,683,529 A | 7/1987 | Bucher | |

(Continued)

FOREIGN PATENT DOCUMENTS
DE 19713814 10/1998
(Continued)

OTHER PUBLICATIONS

Maksimovic, et al., "Impact of Digital Control in Power Electronics", Proceedings of the 2004 International Symposium on Power Semiconductor Devices & ICs, pp. 13-22, Kitakyushu, JP, 2004.

(Continued)

*Primary Examiner* — Daniel D Chang
(74) *Attorney, Agent, or Firm* — Mitch Harris, Atty at Law, LLC; Andrew M. Harris

(57) ABSTRACT

A cascaded power converter having an auxiliary power supply operated from the second switching power stage provides efficient operation by activating the auxiliary power supply early in the startup process. A low energy transfer operating mode is initiated in the second switching power stage to charge the auxiliary power supply output without generating significant disruption at the load. After the first switching power stage is started and the intermediate node voltage has increased to a level sufficient to operate the second switching power stage, the final switching power stage enters a normal operating mode. The low energy transfer operating mode has a substantially reduced switching rate and pulse width from that of the normal operating mode.

30 Claims, 6 Drawing Sheets

U.S. PATENT DOCUMENTS

| | | |
|---|---|---|
| 4,697,210 A | 9/1987 | Toyota et al. |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |
| 4,994,952 A | 2/1991 | Silva et al. |
| 5,001,620 A | 3/1991 | Smith |
| 5,055,746 A | 10/1991 | Hu et al. |
| 5,109,185 A | 4/1992 | Ball |
| 5,121,079 A | 6/1992 | Dargatz |
| 5,206,540 A | 4/1993 | da Sa e Silva et al. |
| 5,264,780 A | 11/1993 | Bruer et al. |
| 5,278,490 A | 1/1994 | Smedley |
| 5,323,157 A | 6/1994 | Ledzius et al. |
| 5,359,180 A | 10/1994 | Park et al. |
| 5,383,109 A | 1/1995 | Maksimovic et al. |
| 5,424,932 A | 6/1995 | Inou et al. |
| 5,477,481 A | 12/1995 | Kerth |
| 5,479,333 A | 12/1995 | McCambridge et al. |
| 5,481,178 A | 1/1996 | Wilcox et al. |
| 5,565,761 A | 10/1996 | Hwang |
| 5,589,759 A | 12/1996 | Borgato et al. |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,768,111 A | 6/1998 | Zaitsu |
| 5,781,040 A | 7/1998 | Myers |
| 5,783,909 A | 7/1998 | Hochstein |
| 5,798,635 A | 8/1998 | Hwang et al. |
| 5,834,858 A | 11/1998 | Crosman, III et al. |
| 5,900,683 A | 5/1999 | Rinehart et al. |
| 5,912,812 A | 6/1999 | Moriarty, Jr. |
| 5,929,400 A | 7/1999 | Colby et al. |
| 5,946,202 A | 8/1999 | Balogh |
| 5,946,206 A | 8/1999 | Shimizu et al. |
| 5,952,849 A | 9/1999 | Haigh et al. |
| 5,960,207 A | 9/1999 | Brown |
| 5,962,989 A | 10/1999 | Baker |
| 5,963,086 A | 10/1999 | Hall |
| 5,966,297 A | 10/1999 | Minegishi |
| 5,994,885 A | 11/1999 | Wilcox et al. |
| 6,016,038 A | 1/2000 | Mueller et al. |
| 6,043,633 A | 3/2000 | Lev et al. |
| 6,072,969 A | 6/2000 | Yokomori et al. |
| 6,083,276 A | 7/2000 | Davidson et al. |
| 6,084,450 A | 7/2000 | Smith et al. |
| 6,091,233 A | 7/2000 | Hwang |
| 6,125,046 A | 9/2000 | Jang et al. |
| 6,150,774 A | 11/2000 | Mueller et al. |
| 6,181,114 B1 | 1/2001 | Hemena et al. |
| 6,211,626 B1 | 4/2001 | Lys et al. |
| 6,211,627 B1 | 4/2001 | Callahan |
| 6,229,271 B1 | 5/2001 | Liu |
| 6,229,292 B1 | 5/2001 | Redl et al. |
| 6,246,183 B1 | 6/2001 | Buonavita |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,344,811 B1 | 2/2002 | Melanson |
| 6,369,525 B1 | 4/2002 | Chang et al. |
| 6,385,063 B1 | 5/2002 | Sadek et al. |
| 6,407,514 B1 | 6/2002 | Glaser et al. |
| 6,407,515 B1 | 6/2002 | Hesler |
| 6,407,691 B1 | 6/2002 | Yu |
| 6,441,558 B1 | 8/2002 | Muthu et al. |
| 6,445,600 B2 | 9/2002 | Ben-Yaakov |
| 6,452,521 B1 | 9/2002 | Wang |
| 6,469,484 B2 | 10/2002 | L'Hermite et al. |
| 6,495,964 B1 | 12/2002 | Muthu et al. |
| 6,509,913 B2 | 1/2003 | Martin, Jr. et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,636,003 B2 | 10/2003 | Rahm et al. |
| 6,646,848 B2 | 11/2003 | Yoshida et al. |
| 6,657,417 B1 | 12/2003 | Hwang |
| 6,688,753 B2 | 2/2004 | Calon et al. |
| 6,713,974 B2 | 3/2004 | Patchornik et al. |
| 6,724,174 B1 | 4/2004 | Esteves et al. |
| 6,727,832 B1 | 4/2004 | Melanson |
| 6,737,845 B2 | 5/2004 | Hwang |
| 6,741,123 B1 | 5/2004 | Andersen et al. |
| 6,753,661 B2 | 6/2004 | Muthu et al. |
| 6,768,655 B1 | 7/2004 | Yang et al. |
| 6,781,351 B2 | 8/2004 | Mednik et al. |
| 6,788,011 B2 | 9/2004 | Mueller et al. |
| 6,806,659 B1 | 10/2004 | Mueller et al. |
| 6,839,247 B1 | 1/2005 | Yang |
| 6,860,628 B2 | 3/2005 | Robertson et al. |
| 6,870,325 B2 | 3/2005 | Bushell et al. |
| 6,873,065 B2 | 3/2005 | Haigh et al. |
| 6,882,552 B2 | 4/2005 | Telefus et al. |
| 6,888,322 B2 | 5/2005 | Dowling et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,958,920 B2 | 10/2005 | Mednik et al. |
| 6,967,448 B2 | 11/2005 | Morgan et al. |
| 6,970,503 B1 | 11/2005 | Kalb |
| 6,975,079 B2 | 12/2005 | Lys et al. |
| 6,975,523 B2 | 12/2005 | Kim et al. |
| 6,980,446 B2 * | 12/2005 | Simada et al. .................. 363/49 |
| 7,003,023 B2 | 2/2006 | Krone et al. |
| 7,034,611 B2 | 4/2006 | Oswal et al. |
| 7,050,509 B2 | 5/2006 | Krone et al. |
| 7,064,498 B2 | 6/2006 | Dowling et al. |
| 7,064,531 B1 | 6/2006 | Zinn |
| 7,072,191 B2 | 7/2006 | Nakao et al. |
| 7,075,329 B2 | 7/2006 | Chen et al. |
| 7,078,963 B1 | 7/2006 | Andersen et al. |
| 7,088,059 B2 | 8/2006 | McKinney et al. |
| 7,099,163 B1 | 8/2006 | Ying |
| 7,102,902 B1 | 9/2006 | Brown et al. |
| 7,106,603 B1 | 9/2006 | Lin et al. |
| 7,109,791 B1 | 9/2006 | Epperson et al. |
| 7,126,288 B2 | 10/2006 | Ribarich et al. |
| 7,135,824 B2 | 11/2006 | Lys et al. |
| 7,145,295 B1 | 12/2006 | Lee et al. |
| 7,158,573 B2 | 1/2007 | Hershbarger |
| 7,158,633 B1 | 1/2007 | Hein |
| 7,161,816 B2 | 1/2007 | Shytenberg et al. |
| 7,180,250 B1 | 2/2007 | Gannon |
| 7,183,957 B1 | 2/2007 | Melanson |
| 7,212,640 B2 | 5/2007 | Bizjak |
| 7,221,130 B2 | 5/2007 | Ribeiro et al. |
| 7,233,135 B2 | 6/2007 | Noma et al. |
| 7,246,919 B2 | 7/2007 | Porchia et al. |
| 7,255,457 B2 | 8/2007 | Ducharm et al. |
| 7,266,001 B1 | 9/2007 | Notohamiprodjo et al. |
| 7,272,585 B2 | 9/2007 | Nomura et al. |
| 7,276,861 B1 | 10/2007 | Shteynberg et al. |
| 7,288,902 B1 | 10/2007 | Melanson |
| 7,289,054 B1 | 10/2007 | Watanabe |
| 7,292,013 B1 | 11/2007 | Chen et al. |
| 7,310,244 B2 | 12/2007 | Yang et al. |
| 7,331,226 B2 | 2/2008 | Feldman et al. |
| 7,345,458 B2 | 3/2008 | Kanal et al. |
| 7,375,476 B2 | 5/2008 | Walter et al. |
| 7,382,635 B2 | 6/2008 | Noda |
| 7,394,210 B2 | 7/2008 | Ashdown |
| 7,511,437 B2 | 3/2009 | Lys et al. |
| 7,538,499 B2 | 5/2009 | Ashdown |
| 7,545,130 B2 | 6/2009 | Latham |
| 7,554,473 B2 | 6/2009 | Melanson |
| 7,569,996 B2 | 8/2009 | Holmes et al. |

| | | |
|---|---|---|
| 7,583,136 B2 | 9/2009 | Pelly |
| 7,656,103 B2 | 2/2010 | Shteynberg et al. |
| 7,667,986 B2 | 2/2010 | Artusi et al. |
| 7,710,047 B2 | 5/2010 | Shteynberg et al. |
| 7,719,246 B2 | 5/2010 | Melanson |
| 7,719,248 B1 | 5/2010 | Melanson |
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yancie et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0231009 A1 | 10/2007 | Watahiki |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0174479 A1 | 7/2009 | Yan et al. |
| 2009/0190379 A1 | 7/2009 | Melanson |
| 2009/0190384 A1 | 7/2009 | Thompson |
| 2009/0191837 A1 | 7/2009 | Nanda |
| 2009/0218960 A1 | 9/2009 | Lyons et al. |
| 2010/0141317 A1 | 6/2010 | Szajnowski |

FOREIGN PATENT DOCUMENTS

| | | |
|---|---|---|
| EP | 0632679 | 1/1995 |
| EP | 0838791 | 4/1998 |
| EP | 1014563 | 6/2000 |
| EP | 1164819 | 12/2001 |
| EP | 1213823 | 6/2002 |
| EP | 1460775 | 9/2004 |
| EP | 1528785 | 5/2005 |
| EP | 1768257 A1 | 3/2007 |
| EP | 2204905 A1 | 7/2010 |
| GB | 2069269 | 8/1981 |
| GB | 2262673 A | 6/1993 |
| WO | WO 91/13417 | 9/1991 |
| WO | WO9725836 | 7/1997 |
| WO | WO 97/42714 | 11/1997 |
| WO | WO 01/15316 | 1/2001 |
| WO | WO 01/84697 | 11/2001 |
| WO | WO 01/97384 | 12/2001 |
| WO | WO 02/15386 | 2/2002 |
| WO | WO 02/27944 | 4/2002 |
| WO | WO 02/091805 | 11/2002 |
| WO | WO2006013557 | 2/2006 |
| WO | WO 2006/067521 | 6/2006 |
| WO | WO 2006/135584 | 12/2006 |
| WO | WO 2007/026170 | 3/2007 |
| WO | WO 2007/079362 | 7/2007 |
| WO | WO2008072160 | 6/2008 |
| WO | WO2008152838 | 12/2008 |

OTHER PUBLICATIONS

L6562 Datasheet, "Transition-Mode PFC Controller", ST Microelectronics, Nov. 2005, Geneva, Switzerland.
http://toolbarpdf.com/docs/functions-and-features-of-inverters.html printed on Jan. 20, 2011.
Mamano, Bob, "Current Sensing Solutions for Power Supply Designers", Unitrode Seminar Notes SEM1200, 1999.
Texas Instruments, Interleaving Continuous Conduction Mode PFC Controller, UCC28070, SLUS794C, Nov. 2007, revised Jun. 2009, Texas Instruments, Dallas TX.
U.S. Appl. No. 12/495,648, filed Jun. 30, 2009, Melanson.
U.S. Appl. No. 12/493,045, filed Jun. 26, 2009, Melanson.
"AN-H52 Application Note: HV9931 Unity Power Factor LED Lamp Driver" Mar. 7, 2007, Supertex Inc., Sunnyvale, CA, USA.
"HV9931 Unity Power Factor LED Lamp Driver, Initial Release", Supertex Inc., Sunnyvale, CA USA 2005.
A. Prodic, Compensator Design and Stability Assessment for Fast Voltage Loops of Power Factor Correction Rectifiers, IEEE Transactions on Power Electronics, vol. 22, No. 5, Sep. 2007.
A. R. Seidel, et al., A Practical Comparison Among High-Power-Factor Electronic Ballasts with Similar Ideas, IEEE Transactions on Industry Applications, vol. 41, No. 6, Nov.-Dec. 2005.
A. Silva De Morais, et al., A High Power Factor Ballast Using a Single Switch with Both Power Stages Integrated, IEEE Transactions on Power Electronics, vol. 21, No. 2, Mar. 2006.
Abramovitz, et al., "A Resonant DC-DC Transformer With Zero Current Ripple", IEEE Transactions on Power Electronics, Nov. 2007, p. 2344-2351, vol. 22, No. 6.
AD7400 Datasheet, "Isolated Sigma-Delta Modulator", Analog Devices 2006.
Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.
Analog Devices, "120 kHz Bandwidth, Low Distortion, Isolation Amplifier", AD215, Norwood, MA, 1996.

Analog Devices, "Isolated Sigma-Delta Modulator", AD7400, Analog Devices, Norwood, MA, 2006.

Azoteq, IQS17 Family, IQ Switch®—ProxSense™ Series, Touch Sensor, Load Control and User Interface, IQS17 Datasheet V2.00.doc, Jan. 2007.

B.A. Miwa, et al., High Efficiency Power Factor Correction Using Interleaved Techniques, Applied Power Electronics Conference and Exposition, Seventh Annual Conference Proceedings, Feb. 23-27, 1992.

Barragan, et al., "Efficiency Optimization in ZVS Series Resonant Inverters With Asymmetrical Voltage-Cancellation Control", IEEE Transactions on Power Electronics, Sep. 2005, p. 1036-1044, vol. 20, No. 5.

BB3656 Datasheet "Transformer Coupled Isolation Amplifier", Burr-Brown 1987.

Ben-Yaakov, et al., "The Dynamics of a PWM Boost Converter with Resistive Input" IEEE Transactions on Industrial Electronics, IEEE Service Center, Piscataway, NJ, USA, vol. 46, No. 3, Jun. 1, 1999.

Bhat, et al., "Analysis and Design of a High-Frequency Resonant Converter Using LCC-Type Commutation", IEEE Transactions on Power Electronics, Oct. 1987, p. 291-301, vol. PE-2 No. 4.

Burr-Brown, "Transformer Coupled Isolation Amplifier," BB3656 Datasheet, Tucson, AZ, 1987.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

C. Dilouie, Introducing the LED Driver, EC&M, Sep. 2004.

C. M. De Oliviera Stein, et al., A ZCT Auxiliary Communication Circuit for Interleaved Boost Converters Operating in Critical Conduction Mode, IEEE Transactions on Power Electronics, vol. 17, No. 6, Nov. 2002.

Chen, et al., "Generalized Optimal Trajectory Control for Closed Loop Control of Series-Parallel Resonant Converter", IEEE Transactions on Power Electronics, Sep. 2006, p. 1347-1355, vol. 21, No. 5.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

Color Temperature, www.sizes.com/units/color_temperature.htm, printed Mar. 27, 2007.

D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

D. Maksimovic, et al., "Switching Converters with Wide DC Conversion Range," Institute of Electrical and Electronic Engineer's (IEEE) Transactions on Power Electronics, Jan. 1991.

D. Rand, et al., Issues, Models and Solutions for Triac Modulated Phase Dimming of LED Lamps, Power Electronics Specialists Conference, 2007.

D.K.W. Cheng, et al., A New Improved Boost Converter with Ripple Free Input Current Using Coupled Inductors, Power Electronics and Variable Speed Drives, Sep. 21-23, 1998.

Dallas Semiconductor, Maxim, "Charge-Pump and Step-Up DC-DC Converter Solutions for Powering White LEDs in Series or Parallel Connections," Apr. 23, 2002.

Data Sheet LT3496 Triple Output LED Driver, Linear Technology Corporation, Milpitas, CA 2007.

De Groot, et al., "Design of a 1-MHz LCC Resonant Converter Based on a DSP-Driven SOI Half-Bridge Power MOS Module", IEEE Transactions on Power Electronics, Nov. 2007, p. 2307-2320, vol. 22 No. 4.

Doyle, et al., Feedback Control Theory, Macmillan Publishing Co., 1990.

Dunn, Jamie, "Determining MOSFET Driver Needs for Motor Drive Applications," AN898 Application Note, Microchip Technology, Chandler, AZ, 2003.

Dustin Rand, et al., "Issues, Models and Solutions for Triac Modulated Phase Dimming of LED Lamps" Power Electronics Specialists Conferrence, 2007. PESC 2007. IEEE, IEEE, P1, Jun. 1, 2007, pp. 1398-1404.

Erickson, Robert W., et al., "Fundamentals of Power Electronics," Second Edition, Chapter 6, Boulder, CO, 2001.

F. T. Wakabayashi, et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

F. Tao, et al., "Single-Stage Power-Factor-Correction Electronic Ballast with a Wide Continuous Dimming Control for Fluorescent Lamps," IEEE Power Electronics Specialists Conference, vol. 2, 2001.

Fairchild Semiconductor, Application Note 42030, Theory and Application of the ML4821 Average Current Mode PFC Controller, Oct. 25, 2000.

Fairchild Semiconductor, Application Note 42030, Theory and Application of the ML4821 Average Current Mode PFC Controller, Aug. 1997.

Fairchild Semiconductor, Application Note 42047 Power Factor Correction (PFC) Basics, Rev. 0.9.0 Aug. 19, 2004.

Fairchild Semiconductor, Application Note 6004, 500W Power-Factor-Corrected (PFC) Converter Design with FAN4810, Rev. 1.0.1, Oct. 31, 2003.

Fairchild Semiconductor, Application Note AN4121, Design of Power Factor Correction Circuit Using FAN7527B, Rev.1.0.1, May 30, 2002.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVA Average Current PFC Controller, Rev. 1.0.1 Aug. 10, 2001.

Fairchild Semiconductor, FAN7527B, Power Factor Correction Controller, 2003.

Fairchild Semiconductor, FAN7532, Ballast Controller, Rev. 1.0.2, Jun. 2006.

Fairchild Semiconductor, FAN7544, Simple Ballast Controller, Rev. 1.0.0, 2004.

Fairchild Semiconductor, FAN7711, Ballast Control IC, Rev. 1.0.2, Mar. 2007.

Fairchild Semiconductor, KA7541, Simple Ballast Controller, Rev. 1.0.3, 2001.

Fairchild Semiconductor, ML4812, Power Factor Controller, Rev. 1.0.4, May 31, 2001.

Fairchild Semiconductor, ML4821, Power Factor Controller, Rev. 1.0.2, Jun. 19, 2001.

Feng, et al., "Ultra Fast Fixed-Frequency Hysteretic Buck Converter With Maximum Charging Current Control and Adaptive Delay Compensation for DSS Applications", IEEE JSSC, IEEE Press, New Jersey, Nov. 2001.

Foster et al., "Cyclic-Averaging for High Speed Analysis of Resonant Converters", IEEE Transactions on Power Electronics, Jul. 2003, p. 985-993, vol. 18, No. 4.

Freescale Semiconductor, AN1965, Design of Indirect Power Factor Correction Using 56F800/E, Jul. 2005.

Freescale Semiconductor, AN3052, Implementing PFC Average Current Mode Control Using the MC9S12E128, Nov. 2005.

Freescale Semiconductor, Inc., Dimmable Light Ballast with Power Factor Correction, Design Reference Manual, DRM067, Rev. 1, Dec. 2005.

G. Yao, et al., Soft Switching Circuit for Interleaved Boost Converters, IEEE Transactions on Power Electronics, vol. 22, No. 1, Jan. 2007.

Gu, et al., "Three-Level LLC Series Resonant DC/DC Converter," IEEE Transactions on Power Electronics, vol. 20, No. 4, p. 781-789, Jul. 2005.

H. L. Cheng, et al., A Novel Single-Stage High-Power-Factor Electronic Ballast with Symmetrical Topology, IEEE Transactions on Power Electronics, vol. 50, No. 4, Aug. 2003.

H. Peng, et al., Modeling of Quantization Effects in Digitally Controlled DC-DC Converters, IEEE Transactions on Power Electronics, vol. 22, No. 1, Jan. 2007.

H. Wu, et al., Single Phase Three-Level Power Factor Correction Circuit with Passive Lossless Snubber, IEEE Transactions on Power Electronics, vol. 17, No. 2, Mar. 2006.

Hattrup, et al., "Fast Estimation Techniques for Digital Control of Resonant Converters", IEEE Transactions on Power Electronics, Jan. 2003, p. 365-372, vol. 18, No. 1.

Hirota, Atsushi, et al., "Analysis of Single Switch Delta-Sigma Modulated Pulse Space Modulation PFC Converter Effectively Using Switching Power Device," IEEE, US, 2002.

Infineon, CCM-PFC Standalone Power Factor Correction (PFC) Controller in Continuous Conduction Mode (CCM), Version 2.1, Feb. 6, 2007.

International Rectifier, Application Note AN-1077,PFC Converter Design with IR1150 One Cycle Control IC, rev. 2.3, Jun. 2005.

International Rectifier, Data Sheet No. PD60230 revC, IR1150(S)(PbF), uPFC One Cycle Control PFC IC Feb. 5, 2007.

International Rectifier, Data Sheet PD60230 revC, Feb. 5, 2007.

International Rectifier, IRAC1150-300W Demo Board, User's Guide, Rev 3.0, Aug. 2, 2005.

Intersil, "Designing with the ISL6752, ISL6753 ZVS Full-Bridge Controllers," Application Note AN1262.0, Aug. 15, 2006.

Intersil, AN1262.0, "Designing with the ISL6752, ISL6753 ZVS Full-Bridge Controllers", Aug. 2006.

J. A. Vilela Jr., et al., An Electronic Ballast with High Power Factor and Low Voltage Stress, IEEE Transactions on Industry Applications, vol. 41, No. 4, Jul./Aug. 2005.

J. Qian, et al., Charge Pump Power-Factor-Correction Technologies Part II: Ballast Applications, IEEE Transactions on Power Electronics, vol. 15, No. 1, Jan. 2000.

J. Qian, et al., New Charge Pump Power-Factor-Correction Electronic Ballast with a Wide Range of Line Input Voltage, IEEE Transactions on Power Electronics, vol. 14, No. 1, Jan. 1999.

J. Turchi, Four Key Steps to Design a Continuous Conduction Mode PFC Stage Using the NCP1653, ON Semiconductor, Publication Order No. AND184/D, Nov. 2004.

J. Zhou, et al., Novel Sampling Algorithm for DSP Controlled 2 kW PFC Converter, IEEE Transactions on Power Electronics, vol. 16, No. 2, Mar. 2001.

J.W.F. Dorleijn, et al., Standardisation of the Static Resistances of Fluorescent Lamp Cathodes and New Data for Preheating, Industry Applications Conference, vol. 1, Oct. 13, 2002-Oct. 18, 2002.

K. Leung, et al., "Dynamic Hysteresis Band Control of the Buck Converter with Fast Transient Response," IEEE Transactions on Circuits and Systems—II: Express Briefs, vol. 52, No. 7, Jul. 2005.

K. Leung, et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue, May 25-28, 2003 pp. III-439-III-442 vol. 3.

K.M. Smedley, One-Cycle Control of Switching Converters, IEEE Transactions on Power Electronics, vol. 10, No. 6, Nov. 1995.

L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.

L. Gonthier, et al., EN55015 Compliant 500W Dimmer with Low-Losses Symmetrical Switches, 2005 European Conference on Power Electronics and Applications, Sep. 2005.

Laouamri, et al., "Modeling and Analysis of Wound Integrated LCT Structure for Single Stage Resonant PFC Rectifier", IEEE Transactions on Power Electronics, Jan. 2003, p. 256-269, vol. 18, No. 1.

Light Dimmer Circuits, www.epanorama.net/documents/lights/lightdimmer.html, printed Mar. 26, 2007.

Light Emitting Diode, http://en.wikipedia.org/wiki/Light-emitting_diode, printed Mar. 27, 2007.

Lilei Gu, et al., "Three-Level LLC Series Resonant DC/DC Converter", IEEE Transactions on Power Electronics, Jul. 2005, p. 781-789, vol. 20, No. 4.

Lin, et al., "Robust Controller Design for a Series Resonant Converter via Duty-Cycle Control", IEEE Transactions on Power Electronics, Sep. 1999, p. 793-802, vol. 14 No. 5.

Linear Technology, "Single Switch PWM Controller with Auxiliary Boost Converter," LT1950 Datasheet, Linear Technology, Inc., Milpitas, CA, 2003.

Linear Technology LTC3705 Datasheet, 2005 Linear Technology, Inc.

Linear Technology, 100 Watt LED Driver, Linear Technology, 2006.

Linear Technology, LT1248, Power Factor Controller, Apr. 20, 2007.

Linear Technology, News Release, Triple Output LED, LT3496, Linear Technology, Milpitas, CA, May 24, 2007.

Linear Technology,"2-Switch Forward Controller and Gate Driver," LTC3705 Datasheet, Linear Technology, Inc., Milpitas, CA, 2005.

Lu, et al., International Rectifier, Bridgeless PFC Implementation Using One Cycle Control Technique, 2005.

Lu, et al., "Quasi Current Mode Control for the Phase-Shifted Series Resonant Converter," IEEE Transactions on Power Electronics, vol. 23, No. 1, p. 353-358, Jan. 2008.

M. Brkovic, et al., "Automatic Current Shaper with Fast Output Regulation and Soft-Switching," S.15.0 Power Converters, Telecommunications Energy Conference, 1993.

M. K. Kazimierczuk, et al., Electronic Ballast for Fluorescent Lamps, IEEE Transactions on Power Electronics, vol. 8, No. 4, Oct. 1993.

M. Madigan, et al., Integrated High-Quality Rectifier-Regulators, IEEE Transactions on Industrial Electronics, vol. 46, No. 4, Aug. 1999.

M. Ponce, et al., High-Efficient Integrated Electronic Ballast for Compact Fluorescent Lamps, IEEE Transactions on Power Electronics, vol. 21, No. 2, Mar. 2006.

M. Radecker, et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.

M. Rico-Secades, et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.

Mammano, B., Resonant Mode Converter Topologies, Texas Instruments, 2001.

Mangat, et al., "A Modified Asymmetrical Pulse-Width-Modulated Resonant DC/DC Converter Topology", IEEE Transactions on Power Electronics, Jan. 2004, p. 104-111, vol. 19, No. 1.

Megaman, D or S Dimming ESL, Product News, Mar. 15, 2007.

National Lighting Product Information Program, Specifier Reports, "Dimming Electronic Ballasts," vol. 7, No. 3, Oct. 1999.

Noon, Jim "UC3855A/B High Performance Power Factor Preregulator", Texas Instruments, SLUA146A, May 1996,Revised Apr. 2004.

NXP, TEA1750, GreenChip III SMPS control IC Product Data Sheet, Apr. 6, 2007.

O. Garcia, et al., High Efficiency PFC Converter to Meet EN61000-3-2 and A14, Proceedings of the 2002 IEEE International Symposium on Industrial Electronics, vol. 3, 2002.

On Semconductor, NCP1606, Cost Effective Power Factor Controller, Mar. 2007.

On Semiconductor, AND8123/D, Power Factor Correction Stages Operating in Critical Conduction Mode, Sep. 2003.

On Semiconductor, MC33260, GreenLine Compact Power Factor Controller: Innovative Circuit for Cost Effective Solutions, Sep. 2005.

On Semiconductor, NCP1605, Enhanced, High Voltage and Efficient Standby Mode, Power Factor Controller, Feb. 2007.

On Semiconductor, NCP1654, Product Review, Power Factor Controller for Compact and Robust, Continuous Conduction Mode Pre-Converters, Mar. 2007.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

P. Lee et al., Steady-State Analysis of an Interleaved Boost Converter with Coupled Inductors, IEEE Transactions on Industrial Electronics, vol. 47, No. 4, Aug. 2000.

Philips, Application Note, 90W Resonant SMPS with TEA1610 SwingChip, AN99011, 1999.

Power Integrations, Inc., "TOP200-4/14 TOPSwitch Family Three-terminal Off-line PWM Switch", XP-002524650, Jul. 1996, Sunnyvale, California.

Power Supply Design Tutorial, SMPS Block Diagram, Basic Concepts, Theory of Operation, http://www.smps.us/power-supply.html, printed Aug. 11, 2008.

Prodic, A., et al., "Dead Zone Digital Controller for Improved Dynamic Response of Power Factor Preregulators," IEEE, 2003.

Prodic, Aleksandar, "Digital Controller for High-Frequency Rectifiers with Power Factor Correction Suitable for On-Chip Implementation," IEEE, US, 2007.
Q. Li, et al., An Analysis of the ZVS Two-Inductor Boost Converter under Variable Frequency Operation, IEEE Transactions on Power Electronics, vol. 22, No. 1, Jan. 2007.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
Renesas, HA16174P/FP, Power Factor Correction Controller IC, Jan. 6, 2006.
S. Ben-Yaakov, et al., Statics and Dynamics of Fluorescent Lamps Operating at High Frequency: Modeling and Simulation, IEEE Transactions on Industry Applications, vol. 38, No. 6, Nov.-Dec. 2002.
S. Chan, et al., Design and Implementation of Dimmable Electronic Ballast Based on Integrated Inductor, IEEE Transactions on Power Electronics, vol. 22, No. 1, Jan. 2007.
S. Dunlap, et al., Design of Delta-Sigma Modulated Switching Power Supply, Circuits & Systems, Proceedings of the 1998 IEEE International Symposium, 1998.
S. Lee, et al., A Novel Electrode Power Profiler for Dimmable Ballasts Using DC Link Voltage and Switching Frequency Controls, IEEE Transactions on Power Electronics, vol. 19, No. 3, May 2004.
S. Lee, et al., TRIAC Dimmable Ballast with Power Equalization, IEEE Transactions on Power Electronics, vol. 20, No. 6, Nov. 2005.
S. Skogstad, et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
S. Zhou, et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.
Spiazzi G., et al., "Analysis of a High-Power Factor Electronic Ballast for High Brightness Light Emitting Diodes" Power Electronics Specialists, 2005 IEEE 36th Conference on Jun. 12, 2005, Piscatawa, NJ, USA, IEEE, Jun. 12, 2005, pp. 1494-1499.
ST Microelectronics, AN993, Application Note, Electronic Ballast with PFC Using L6574 and L6561, May 2004.
ST Microelectronics, L6574, CFL/TL Ballast Driver Preheat and Dimming, Sep. 2003.
ST Microelectronics, Power Factor Corrector L6561, Jun. 2004.
ST Microelectronics, L6563, Advanced Transition-Mode PFC Controller, Mar. 2007.
Supertex Inc., 56W Off-line LED Driver, 120VAC with PFC, 160V, 350mA Load, Dimmer Switch Compatible, DN-H05, Feb. 2007.
Supertex Inc., Buck-based LED Drivers Using the HV9910B, Application Note AN-H48, Dec. 28, 2007.
Supertex Inc., HV9931 Unity Power Factor LED Lamp Driver, Application Note AN-H52, Mar. 7, 2007.
T. Wu, et al., Single-Stage Electronic Ballast with Dimming Feature and Unity Power Factor, IEEE Transactions on Power Electronics, vol. 13, No. 3, May 1998.
Texas Instruments, "BiCMOS Advanced Phase-Shift PWM Controller Datasheet," UCC1895, UCC2895, UCC3895, Dec. 1999, Rev. Apr. 2008.
Texas Instruments, Application Note SLUA321, Startup Current Transient of the Leading Edge Triggered PFC Controllers, Jul. 2004.
Texas Instruments, Application Report SLUA308, UCC3817 Current Sense Transformer Evaluation, Feb. 2004.
Texas Instruments, Application Report SLUA369B, 350-W, Two-Phase Interleaved PFC Pre-Regulator Design Review, Mar. 2007.
Texas Instruments, Application Report SPRA902A, Average Current Mode Controlled Power Factor Correctiom Converter using TMS320LF2407A, Jul. 2005.
Texas Instruments, Application Report, SLUA309A, Avoiding Audible Noise at Light Loads when using Leading Edge Triggered PFC Converters, Sep. 2004.
Texas Instruments, SLOS318F, "High-Speed, Low Noise, Fully-Differential I/O Amplifiers," THS4130 and THS4131, US, Jan. 2006.
Texas Instruments, SLUS828B, "8-Pin Continuous Conduction Mode (CCM) PFC Controller," UCC28019A, US, revised Apr. 2009.
Texas Instruments, Transition Mode PFC Controller, SLUS515D, Jul. 2005.
Texas Instruments, UCC3817 BiCMOS Power Factor Preregulator Evaluation Board User's Guide, Nov. 2002.
Tuomainen, et al., "Effect of Resonant Transition on Efficiency of Forward Converter with Active Clamp and Self-Driven SRs", IEEE Transactions on Power Electronics, Mar. 2005, p. 315-323, vol. 20, No. 2.
Unitrode Products From Texas Instruments, BiCMOS Power Factor Preregulator, Feb. 2006.
Unitrode Products From Texas Instruments, High Performance Power Factor Preregulator, Oct. 2005.
Unitrode Products From Texas Instruments, Programmable Output Power Factor Preregulator, Dec. 2004.
Unitrode, Design Note DN-39E, Optimizing Performance in UC3854 Power Factor Correction Applications, Nov. 1994.
Unitrode, High Power-Factor Preregulator, Oct. 1994.
Unitrode, L. Balogh, Design Note UC3854A/B and UC3855A/B Provide Power Limiting with Sinusoidal Input Current for PFC Front Ends, SLUA196A, Nov. 2001.
V. Nguyen, et al., "Tracking Control of Buck Converter Using Sliding-Mode with Adaptive Hysteresis," Power Electronics Specialists Conference, 1995. PESC apos; 95 Record., 26th Annual IEEE vol. 2, Issue, Jun. 18-22, 1995 pp. 1086-1093.
Vishwanathan, et al., "High Voltage DC Power Supply Topology for Pulsed Load Applications with Converter Switching Synchronized to Load Pulses," Power Electronics Group, Bangalore, India, Nov. 2003, vol. 1.
W. Zhang, et al., A New Duty Cycle Control Strategy for Power Factor Correction and FPGA Implementation, IEEE Transactions on Power Electronics, vol. 21, No. 6, Nov. 2006.
Why Different Dimming Ranges? The Difference Between Measured and Perceived Light, 2000 http://www.lutron.com/ballast/pdf/LutronBallastpg3.pdf.
Wong, et al., "Steady-state Analysis of Hysteretic Control Buck Converters", Power Electronics and Motion Control Conference, IEEE Press, New Jersey, Sep. 2008.
Xie, et al., "Analysis and Optimization of LLC Resonant Converter With a Novel Over-Current Protection Circuit", IEEE Transactions on Power Electronics, Mar. 2007, p. 435-443, vol. 22 No. 2.
Y. Ji, et al., Compatibility Testing of Fluorescent Lamp and Ballast Systems, IEEE Transactions on Industry Applications, vol. 35, No. 6, Nov./Dec. 1999.
Y. Ohno, Spectral Design Considerations for White LED Color Rendering, Final Manuscript, Optical Engineering, vol. 44, 111302 (2005).
Yan Lu, et al., "Quasi Current Mode Control for the Phase-Shifting Series Resonant Converter", IEEE Transactions on Power Electronics, Jan. 2008, p. 353-358, vol. 23 No. 1.
Ye, et al., "A Robust One-Cycle Controlled Full-Bridge Series-Parallel Resonant Inverter for a High Frequency AC (HFAC) Distribution System", IEEE Transactions on Power Electronics, Nov. 2007, p. 2331-2343, vol. 22, No. 6.
Z. Lai, et al., A Family of Power-Factor-Correction Controllers, Twelfth Annual Applied Power Electronics Conference and Exposition, vol. 1, Feb. 23, 1997-Feb. 27, 1997.
Zhao, et al., "Steady-state and Dynamic Analysis of a Buck Converter Using a Hysteretic PWM Control", Power Electronics Specialists Conference, IEEE Press, New Jersey, Jun. 2004.
Zie, et al., "Analysis and Optimization of LLC Resonant Converter with a Novel Over-Current Protection Circuit," IEEE Transactions on Power Electronics, vol. 22, No. 2, p. 435-443, Mar. 2007.

* cited by examiner

LOW ENERGY TRANSFER MODE FOR AUXILIARY POWER SUPPLY OPERATION IN A CASCADED SWITCHING POWER CONVERTER

BACKGROUND OF THE INVENTION

1. Field of the Invention

The present invention relates generally to switching power regulator circuits, and more specifically, to a cascaded switching power converter in which an auxiliary winding power supply is provided with energy from a final power converter stage by operating the switching power converter in a low energy transfer mode.

2. Background of the Invention

In order to supply power to control circuits of a line-powered switching power converter, a low voltage power supply is needed, typically between 3V and 12V at a few milliamperes of current. However, until the power converter is operating, the only source typically available is the AC power line. The high voltage of the AC power line makes it impractical to use resistors to drop the voltage to the required voltage for the controller, as the power dissipation in the resistor will typically be on the order of several Watts.

Therefore, an auxiliary winding provided on one of the converter magnetics is frequently used to supply power to the converter controller integrated circuit (IC), since a lower voltage can be generated through use of the auxiliary winding, therefore reducing wasted power. The auxiliary power supply could be operated from the first stage, but in an AC line-powered cascaded converter, the first stage has inductor/transformer currents that vary with the input voltage. In cascaded converters in which the first stage is a power factor corrector (PFC), the input current will vary directly with the input voltage. In other cascaded converters in which the line input is rectified and filtered, unless the filter has a low ripple under all loading conditions, and therefore is quite large, there will still be substantial AC variation on the input at high load conditions. Therefore, it is desirable in such applications, to place the auxiliary winding on one of the magnetic components in the second stage. In a cascaded power converter, the second stage is generally not activated until the output voltage of the first stage has reached a level that ensures the second stage will operate properly. Therefore, the resistor drop power supply configuration, generally with a Zener diode to regulate the output voltage, is generally used at least until the second stage is started, lowering overall efficiency and raising the level of heat generated by the power supply.

A second stage auxiliary power supply provided from a DC-DC converter stage that receives its input from a first stage PFC still has an output voltage that varies with the intermediate node voltage at the input of the DC-DC converter, which varies with the magnitude of the AC power line voltage provided at the input to the PFC. In order to ensure that there is sufficient voltage available to operate the controller IC under all input line conditions, the maximum auxiliary power supply output voltage will typically be much higher than the minimum required output voltage. Therefore, the IC must either be designed to handle the full range of power supply voltages that may be provided from the auxiliary winding or the voltage must be regulated, e.g., with a Zener diode circuit, wasting power, dissipating heat, and typically reducing reliability.

Therefore, it would be desirable to provide a cascaded power converter that can supply internal controller circuits with an auxiliary power supply operated from the second (or later) stage of the cascaded power converter. It would further be desirable to provide such an auxiliary power supply that can operate from a widely varying auxiliary winding voltage, without requiring a Zener diode or another lossy regulation technique.

SUMMARY OF THE INVENTION

The above stated objective of providing a cascaded power converter with an auxiliary power supply circuit operated from a second or later stage, is provided in a cascaded switching converter and a method of operation of the switching converter.

The cascaded switching converter has a first stage that receives its input from a power source, which may be an AC power line and has an output coupled to an intermediate node. The cascaded switching converter also has a second stage having an input coupled to the intermediate node and an output providing an output of the cascaded power converter. An auxiliary winding is provided on a magnetic coupling element of the second stage, and the second stage includes a start-up control circuit that operates the second stage in a low energy transfer mode during start-up of the second stage and prior to start-up of the first stage to provide a voltage at the auxiliary winding. Therefore, the auxiliary power supply can operate during startup of the second stage without generating substantial current at the output of the cascaded power converter. The magnetic coupling element may be a transformer that does not store substantial energy during operation, or an inductor or transformer that transfers energy by discrete current switching.

The auxiliary winding may be provided to an auxiliary power supply circuit having a selectable operating mode that has a different input to output voltage characteristic for each operating mode. The selection of the auxiliary power supply's operating mode may be made in response to measuring the output voltage of the auxiliary power supply, and may be performed dynamically, providing a hysteretic controller that further improves the efficiency of the auxiliary power supply.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses auxiliary power supply circuits in cascaded converters and methods for providing power to control and/or other circuits internal to a cascaded switching power converter, in which the auxiliary power supply is provided from a second (or later) stage of the cascaded switching power converter. The cascaded power converter may be a power factor corrector (PFC) followed by a DC-DC converter stage. A low energy transfer mode is provided in the second (or later) stage of the cascaded converter. The low energy transfer mode provides enough energy to charge the output of the auxiliary power supply, which is operated from an auxiliary winding of one of the magnetic components of the second stage. The low energy transfer mode generally has a much lower switching rate and a lower pulse width than the switching rate and pulse width of the second stage in normal operation, so that the load connected to the output of the cascaded converter is not disrupted/powered during the low energy transfer mode of operation.

An auxiliary power supply circuit having a selectable operating mode is used to change the output/input voltage characteristic of the auxiliary power supply to compensate for changes in the input voltage of the second stage. For example, prior to operation of a PFC input stage, the peak of the input voltage may be available across an intermediate node that interconnects the stages, while the peak-to-peak voltage may be available after the first stage is operational, resulting in a change of 2:1 in the available voltage from the auxiliary winding. The operating mode of the auxiliary power supply can be used to compensate for this change as well as others, and can be operated in a hysteretic feedback configuration in which the mode is selected to regulate the auxiliary power supply output voltage.

Figure 1:
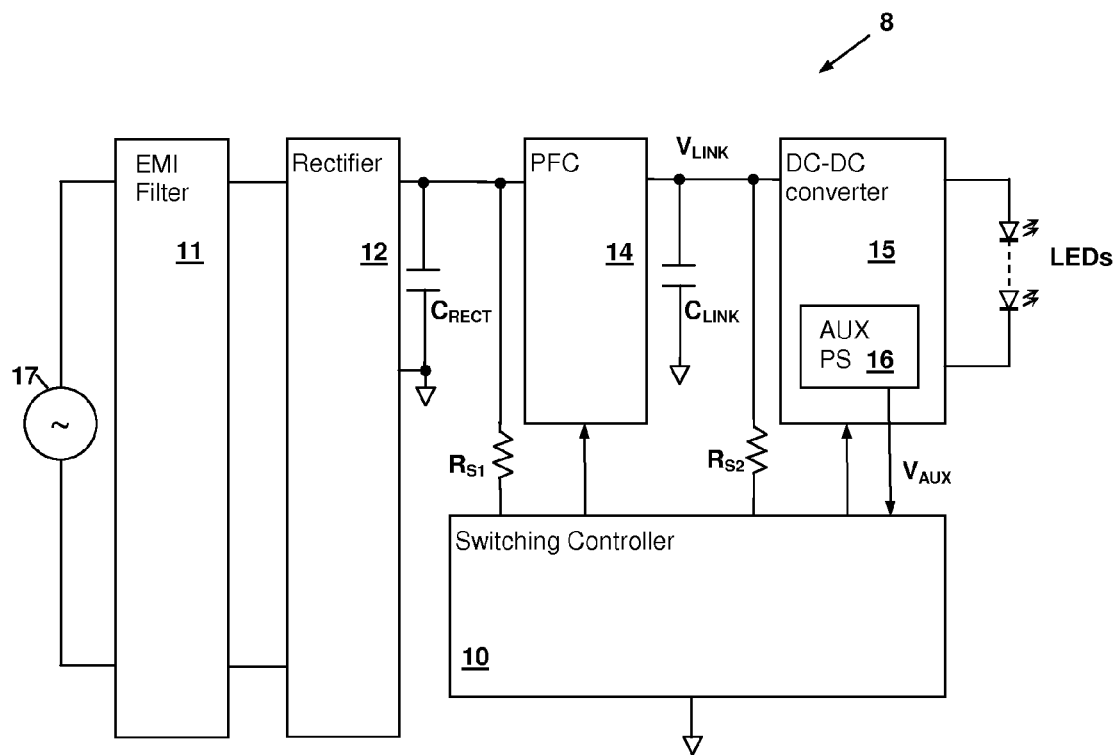
FIG. 1 is a block diagram depicting a cascaded switching converter in accordance with an embodiment of the present invention.

Referring now to FIG. 1, a cascaded switching power converter 8 in accordance with an embodiment of the present invention is shown. A switching controller 10 provides control signals to control switching devices in a first stage PFC 14 and a second stage DC-DC converter 15, which are connected by an intermediate node. A capacitor $C_{LINK}$ holds the intermediate node voltage and a capacitor $C_{RECT}$ holds the input voltage provided to PFC 14 from rectifier 12 which is coupled to an AC power line source 17 by electromagnetic interference (EMI) filter 11. The output of DC-DC converter 15 is used in the illustrated embodiment to power light-emitting diodes LEDs in a lighting application. However, the techniques of the present invention can be applied to cascaded power converters for other applications, as well as cascade configurations other than PFC/DC-DC.

DC-DC converter 15 includes an auxiliary power supply 16 that supplies power to controller 10 for operation of internal circuits as well as to provide the gate drive currents that operate switching devices in PFC 14 and DC-DC converter 15. Until auxiliary power supply 16 is generating sufficient voltage to operate at least some of the circuits within controller 10, power is obtained through resistor $R_{S1}$ and resistor $R_{S2}$. Auxiliary power supply 16 is operated from an auxiliary winding aux provided from a magnetic coupling element of DC-DC converter 15. Therefore, auxiliary winding aux only generates an output voltage $V_{AUX}$ after DC-DC converter 15 has started switching. A normal sequence of operation of a typical cascaded converter similar to that of cascaded switching power converter 8, would be to start operation of PFC 14 once the voltage across capacitor $C_{RECT}$ has reached a predetermined threshold voltage, and then to start operation of DC-DC converter 15 after voltage $V_{LINK}$ across capacitor $C_{LINK}$ has reached a steady-state value as indicated by voltage $V_{LINK}$ reaching another predetermined threshold voltage. However, cascaded switching power converter 8, in accordance with an embodiment of the present invention, provides a low energy transfer mode in which DC-DC converter 15 can be started at the same time as, or alternatively before, PFC 14 is operating.

Figure 2:
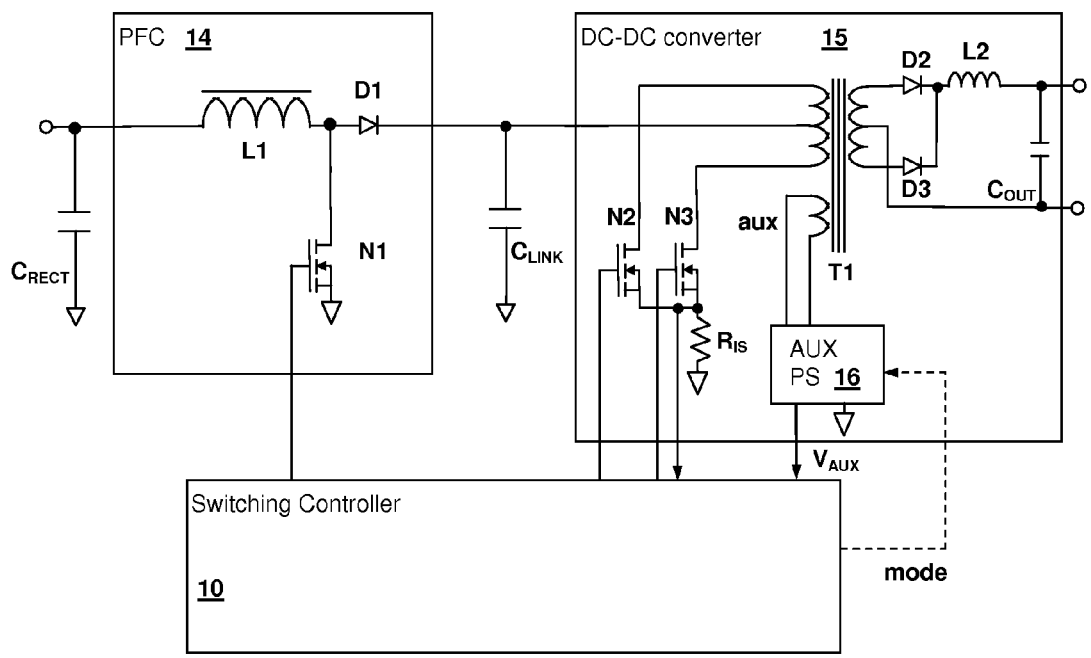
FIG. 2 is a simplified schematic diagram depicting details of portions of the cascaded switching converter of FIG. 1.

Referring now to FIG. 2, details of the cascaded switching power converter 8 of FIG. 1 are shown. An inductor L1 and a switching transistor N1 provide a boost configuration PFC that charges capacitor $C_{LINK}$ to a voltage approximately equal to 400VDC, given a 360VDC input voltage across capacitor $C_{RECT}$. The gate of transistor N1 is controlled by controller 10 such that the input impedance of PFC 14 has substantially no reactive component, i.e., PFC 14 appears as a resistance across AC power line source 17. Prior to start-up, since diode D1 acts as a peak-detector, the peak voltage of the rectified version of AC power line source 17 appears across capacitor $C_{LINK}$ after the first input peak of AC power line source 17. Controller 10 can operate DC-DC converter 15 in a low energy transfer mode, switching infrequently and with narrow pulses, to generate auxiliary power supply output voltage $V_{AUX}$, as will be explained in further detail below.

DC-DC converter 15 is a forward push-pull converter that switches transistors N2 and N3 across split halves of a primary winding of a transformer T1 in sequence to generate a bipolar power waveform. At the secondary winding of transformer T1, the bipolar power waveform is rectified by diodes D2 and D3, and filtered by inductor L2 in combination with capacitor $C_{OUT}$. Transformer T1 also supplies auxiliary winding aux as described above. A resistor $R_{IS}$ provides a voltage drop that is supplied to switching controller 10. The voltage drop across resistor $R_{IS}$ is proportional to the current being switched through transistor N2 or transistor N3, providing current-mode feedback indicative of the current provided through a load, such as light-emitting diodes LEDs of FIG. 1.

In an illustrative example of operation, prior to switching any of the switching transistors N1-N3, approximately 160VDC (the peak voltage of a typical AC power line source) is available across capacitor $C_{LINK}$ due to peak detection of the rectified signal appearing across capacitor $C_{RECT}$. Once the voltage obtained through resistor $R_{S1}$ and resistor $R_{S2}$ is sufficient to operate controller and initialization of controller has been performed, controller 10 begins to operate PFC 14 to boost and regulate the voltage provided across capacitor $C_{LINK}$. Controller 10 also begins to switch transistors N2 and N3 in DC-DC converter 15 for short durations at a very low repetition rate, e.g., 20 kHz, which while insufficient to provide much current through light-emitting diodes LEDs, e.g. <5% of the nominal current and for short durations, provides enough current through an auxiliary winding aux of transformer T1 to generate auxiliary power supply output voltage $V_{AUX}$. Since transistors N2 and N3 are switched at a low rate, the current requirements from auxiliary power supply 16 are also lower than the requirements during normal switching operation of DC-DC converter 15. Once voltage $V_{LINK}$ has increased sufficiently, controller 10 places DC-DC converter 15 in normal operating mode. Once voltage $V_{LINK}$ has increased to its full value, the available voltage across auxiliary winding aux is approximately twice the voltage present during the startup low energy transfer mode, since the output of PFC 15 doubles once switching of transistor N1 begins. The operating mode of auxiliary power supply 16 is changed at this time, according to the mode selection signal mode provided from controller 10, or by internal detection of the mode selection condition as will be described in detail below.

While the above-described operation sequence is for startup, in application such as the illustrated LED lighting application, when light-emitting diodes LEDs are completely off, which may be done during dimming according to a duty factor, or at 100% dimming, the output is de-activated by stopping switching of DC-DC converter 15 while PFC 14 continues to regulate voltage $V_{LINK}$. Therefore, in order to maintain voltage $V_{AUX}$ at the output of auxiliary power supply 16, the low energy transfer mode of DC-DC converter 15 can be entered again, and the small amount of current generated through light-emitting diodes LEDs will not disrupt the dimming operation.

After startup or leaving dimming mode and returning to normal operation, if auxiliary power supply 16 included only a linear regulation circuit, such as a Zener diode, then the power dissipated in auxiliary power supply 16 would be approximately the same as the power delivered to controller 10, assuming that the voltage delivered to controller 10 must be the same prior to the startup of PFC 14 and after the startup of PFC 14. Therefore, auxiliary power supply 16 of the illustrated embodiment includes a voltage doubler having a selectable operating mode as mentioned above. Auxiliary power supply 16 produces a DC output having a magnitude substantially equal to half of the peak-to-peak voltage available across auxiliary winding aux in one operating mode, and a DC output having a magnitude substantially equal to the average of the peak magnitudes of the voltage available across auxiliary winding aux in another operating mode. In both operating modes, the actual voltage provided at the output of auxiliary power supply 16 will be reduced by circuit voltage drops. During startup, and prior to controller 10 beginning normal operation of DC-DC converter 15, auxiliary power supply 16 is placed in doubler mode by asserting control signal mode which can be provided from controller 10 or can be determined within auxiliary power supply 16 as will be illustrated below. After PFC 14 has increased the voltage available across capacitor $C_{LINK}$, auxiliary power supply 16 is either placed in non-doubler mode, or is operated in a hysteretic regulation mode as will be described in further detail below.

Figure 3:
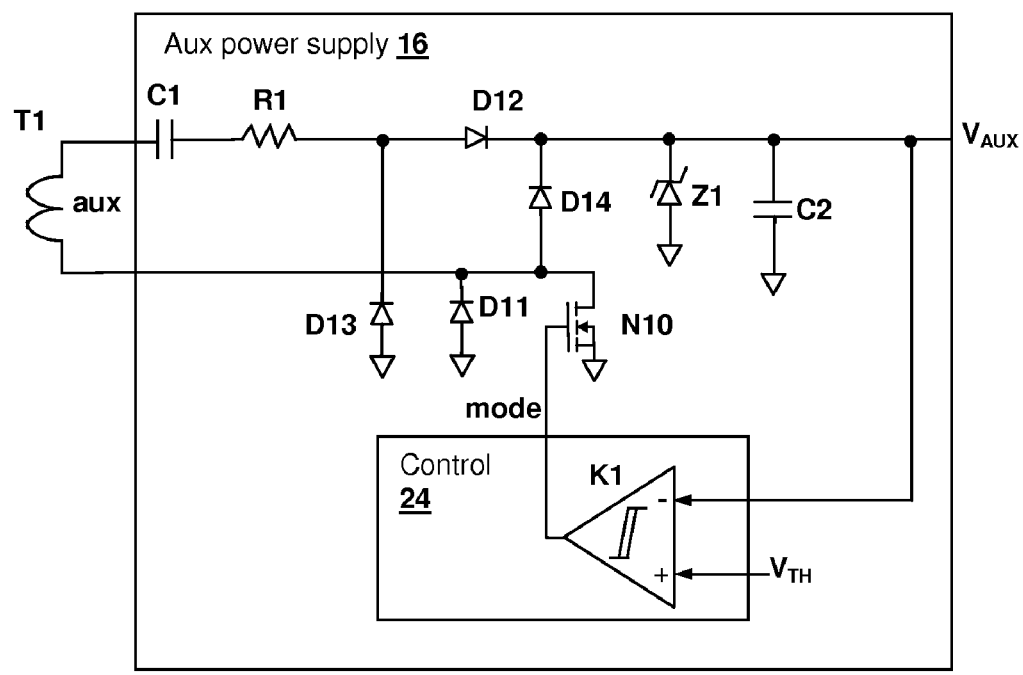
FIG. 3 is a schematic diagram depicting details of auxiliary power supply 16 of FIG. 1.

Referring now to FIG. 3, details of auxiliary power supply 16 are shown in accordance with an embodiment of the invention. The input of auxiliary power supply 16 is connected to auxiliary winding aux of transformer T1. A capacitor C1 AC-couples auxiliary winding aux to the inputs of auxiliary power supply 16, so that in a first operating mode, selected by activating transistor N10, diodes D11 and D14 are effectively removed, since diode D14 will remain reverse-biased and diode D11 is shorted. In the first operating mode, auxiliary power supply circuit 16 operates as a voltage doubler circuit.

In the doubler operating mode of auxiliary power supply 16, during a negative phase of the voltage across auxiliary winding aux, diode D13 conducts and capacitor C1 charges to the negative peak of the voltage available across auxiliary winding aux, less the voltage drop of diode D13, and during this phase, diode D12 is reverse-biased. During the next positive phase of the voltage available across auxiliary winding aux, diode D13 is reverse-biased and diode D12 conducts. The voltage across auxiliary winding aux during the positive phase is added to the voltage that was placed on capacitor C1 during the previous negative phase, resulting in a "voltage addition." The voltage doubler circuit implemented by auxiliary power supply 16 in the first operating mode is referred to as a voltage doubler by convention, which in the illustrated application is true since the push-pull operation of transistors N2 and N3 result in substantially equal voltage negative and positive pulses across auxiliary winding aux.

In a second mode of operation of auxiliary power supply 16, transistor N10 is de-activated, and diodes D11-D14 act as a full-wave bridge rectifier that rectifies the AC-coupled voltage available across auxiliary winding aux as coupled through capacitor C1. Since auxiliary winding aux is AC-coupled, the DC potential between the inputs of the bridge rectifier formed by diodes D11-D14 can be non-zero and will assume the difference between the positive and negative peaks of the voltage available across auxiliary winding aux appears across capacitor C1. Therefore, the positive and negative peak voltages provided by the outputs of the bridge rectifier formed by diodes D11-D14, which provides the output of auxiliary power supply 16 in the second operating mode is ideally half of the voltage produced in the first operating mode, but both output voltages will differ from the above output voltage due to diode and other circuit voltage drops.

As mentioned above, controller 10 can signal auxiliary power supply 16 to leave the voltage doubler mode after PFC 14 is operational or when DC-DC converter 15 enters normal operating mode. Alternatively, the two operating modes of auxiliary power supply 16 can be used in conjunction to form a regulator. Auxiliary power supply 16 of FIG. 3 illustrates such a regulator. A hysteresis comparator K1 within control circuit 24 controls the gate of transistor N10 by comparing auxiliary power supply output voltage $V_{AUX}$ with a threshold voltage $V_{TH}$, which can be generally set to any voltage between the auxiliary power supply output voltage $V_{AUX}$ of the first operating mode and the second operating mode. The resulting operation regulates auxiliary power supply output voltage $V_{AUX}$ to a desired level by controlling the operating mode of auxiliary power supply in conformity with a magnitude of auxiliary power supply output voltage $V_{AUX}$.

Figure 4:
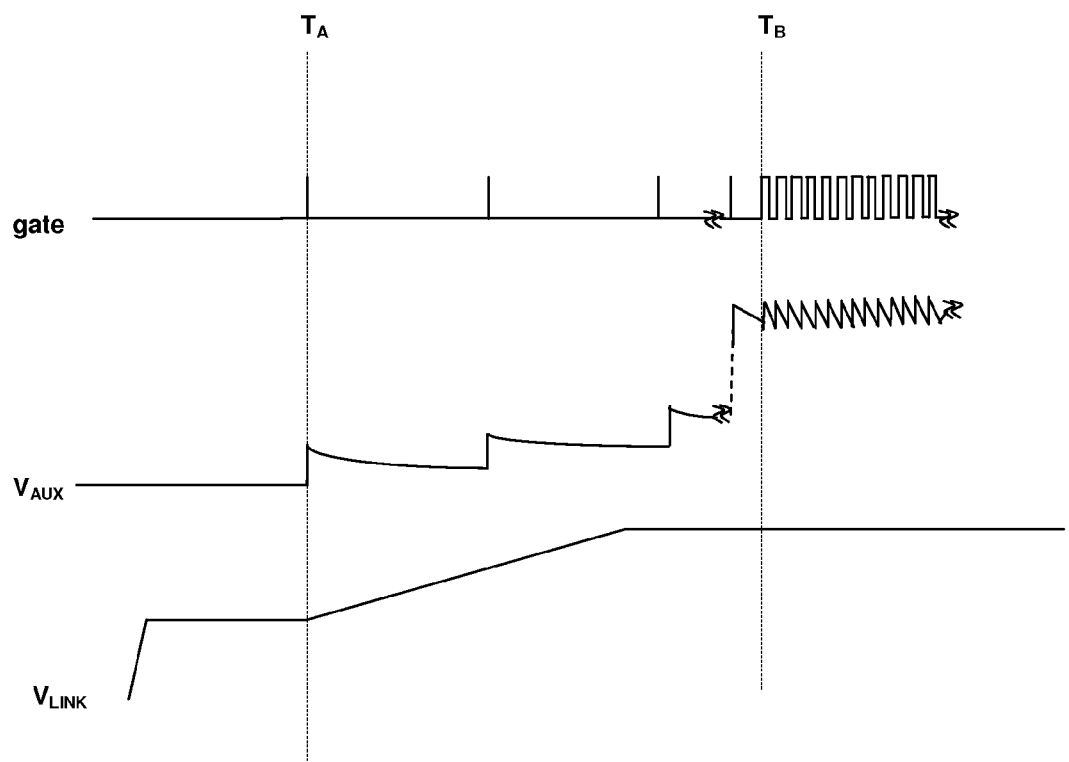
FIG. 4 is a signal waveform diagram depicting details of operation of the cascaded switching converter of FIG. 1 in accordance with an embodiment of the invention.

Referring now to FIG. 4, operation of DC-DC converter 15 during startup or dimming mode is illustrated. Before time $T_A$ for startup, voltage $V_{LINK}$ has increased to the peak voltage of the input line and no switching operation has commenced. Between times $T_A$ and $T_B$, the low energy transfer mode of DC-DC converter 15 charges output voltage $V_{AUX}$ according to narrow, infrequent pulses, e.g. a 2.5 μs pulse every 50 μs. After time $T_B$, normal operating mode is commenced, in which switching is performed at the normal switching rate, e.g. every 10 μs. Also between times $T_A$ and $T_B$, voltage $V_{LINK}$ increases due to operation of PFC 14.

Figure 5:
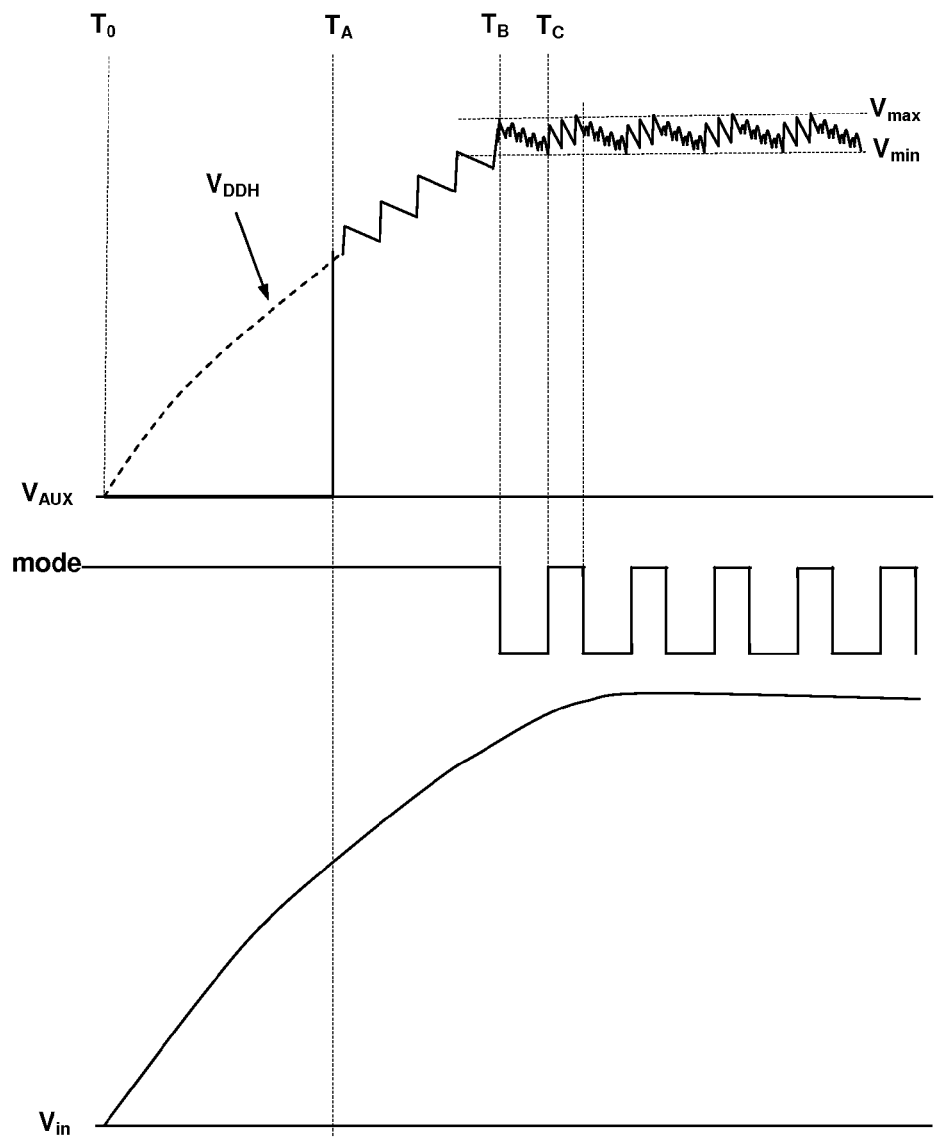
FIG. 5 is a signal waveform diagram depicting details of operation of the switching converter of FIG. 1 in accordance with an embodiment of the invention.

Referring now to FIG. 5, operation of auxiliary power supply 16 in hysteretic regulation is shown at startup. Signal mode indicates the state of the gate of transistor N10. Between time $T_0$ and time $T_A$, power to switching controller 10 is provided through resistor $R_{S1}$ and resistor $R_{S2}$ as represented by power supply voltage $V_{DDH}$, while auxiliary power supply output voltage $V_{AUX}$ is illustrated as zero. In actual implementations, the auxiliary power supply output may not be isolated from resistor $R_{S1}$ and resistor $R_{S2}$ and may increase as indicated for voltage $V_{DDH}$. From time $T_A$ to time $T_B$, auxiliary power supply 16 remains in the first "doubler" operating mode and auxiliary power supply output voltage $V_{AUX}$ increases in steps as the pulses of the low energy transfer operating mode of DC-DC converter 15 charge capacitor C2 at the output of auxiliary power supply 16. At time $T_B$, output voltage $V_{AUX}$ reaches threshold voltage $V_{TH}$ plus the hysteresis voltage of comparator K1, maximum voltage $V_{max}$, and the output of hysteresis comparator K1 changes to select the full-wave bridge operating mode of auxiliary power supply 16. Output voltage $V_{AUX}$ decreases until at time $T_C$, a voltage of threshold voltage $V_{TH}$ minus the hysteresis voltage of comparator K1, minimum voltage $V_{min}$, is reached, and the output of hysteresis comparator K1 changes to again select the doubling operating mode of auxiliary power supply 16.

Figure 6:
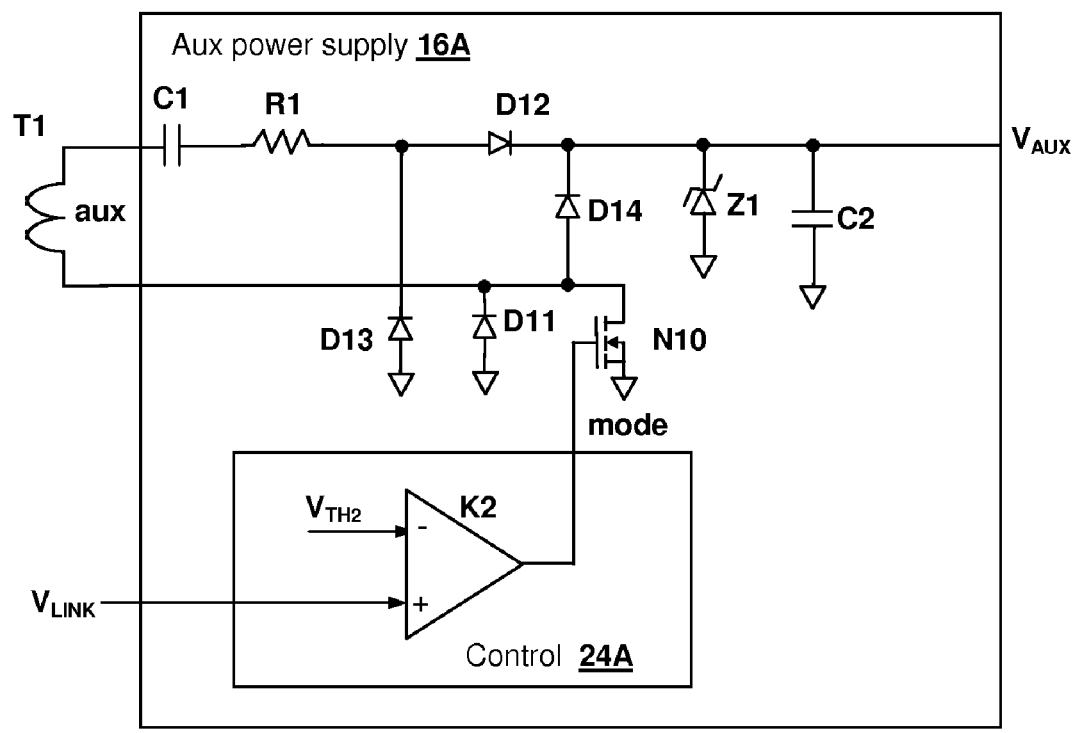
FIG. 6 is a schematic diagram depicting details of an alternative auxiliary power supply 16A that may be used to implement auxiliary power supply 16 of FIG. 1, in accordance with an alternative embodiment of the present invention.

Referring now to FIG. 6, details of an auxiliary power supply 16A that can alternatively be used to implement auxiliary power supply 16 of FIG. 1, are shown in accordance with an alternative embodiment of the invention. Auxiliary power supply 16A is similar to auxiliary power supply 16 of FIG. 3, and therefore only differences between them will be described below. Instead of deriving control signal mode from comparison to of output voltage $V_{AUX}$ to threshold voltage $V_{TH}$, in auxiliary power supply 16A, link voltage $V_{LINK}$ is compared to another threshold voltage $V_{TH2}$ using a comparator K2, which determines the link voltage magnitude at which doubling of the output voltage of auxiliary winding aux will be discontinued by controlling the state of control signal mode. Threshold voltage $V_{TH2}$ may be the same threshold voltage used to determine selection of the low energy transfer mode of DC-DC converter 15, and comparator K2 along with control signal mode may be the same comparator and control signal used to select the low energy transfer mode, or the threshold voltage and control signals that select the low energy transfer mode of DC-DC converter 15 and voltage doubling action of auxiliary power supply 16A can be separate.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A cascaded power converter, comprising:
a first switched-power circuit having an input coupled to a power source and an output coupled to an intermediate node; and
a second switched-power circuit having an input coupled to the intermediate node and an output providing an output of the cascaded power converter, wherein the second switched-power circuit includes a magnetic coupling element for coupling the input of the second switched-power circuit to the output of the first switched-power circuit and having a primary winding and an auxiliary winding, wherein the second switched-power supply includes a control circuit that causes the second switched-power circuit to operate in a low energy transfer operating mode when a voltage at the intermediate node is below a normal operating voltage or when the output of the cascaded power converter is effectively disabled by the control circuit stopping normal switching operation of the second switched-power circuit, wherein in the low energy transfer operating mode, energy sufficient to operate the control circuit from the auxiliary winding is transferred to the auxiliary winding.

2. The cascaded power converter of claim 1, wherein during startup of the cascaded power converter, the control circuit operates the second switched-power circuit in the low energy transfer operating mode, whereby the voltage is produced at an output of an auxiliary power supply having an input coupled to the auxiliary winding, before the voltage at the intermediate node has reached a steady-state value.

3. The cascaded power converter of claim 1, wherein in response to an indication to disable the output of the cascaded power converter, the control circuit operates the second switched-power circuit in the low energy transfer operating mode whereby the voltage is produced at the auxiliary winding without generating substantial current at the output of the cascaded power converter.

4. The cascaded power converter of claim 3, wherein the cascaded power converter is a power supply for supplying a light-emitting diode illuminator, wherein the indication is an indication to place the cascaded power converter in a dimming state.

5. The cascaded power converter of claim 1, wherein in the low energy transfer operating mode, the second switched-power circuit has a first pulse repetition rate substantially lower than a second pulse repetition rate of the second switched-power circuit during ordinary operation of the second switched-power circuit.

6. The cascaded power converter of claim 5, wherein in the low energy transfer operating mode, the second switched-power circuit has a fixed pulse width substantially shorter than an operating pulse width of the second switched-power circuit during ordinary operation of the second switched-power circuit.

7. The cascaded power converter of claim 5, wherein the second pulse repetition rate is greater than or equal to five times the first pulse repetition rate.

8. The cascaded power converter of claim 1, wherein the power source is an AC power source, wherein the first switched-power circuit is a power factor corrector, and wherein the second switched-power circuit is a DC-DC converter.

9. The cascaded power converter of claim 1, further comprising an auxiliary power supply circuit having an input coupled to the auxiliary winding and providing an auxiliary power supply output for supplying power to the control circuit, wherein the auxiliary power supply has a selectable operating mode, wherein in a first operating mode of the auxiliary power supply circuit, a first voltage of the auxiliary power supply output is greater than a second voltage of the auxiliary power supply output in a second operating mode.

10. The switched-power circuit of claim 9, wherein the operating mode of the auxiliary power supply circuit is selected in conformity with a magnitude of the output voltage, whereby the auxiliary power supply circuit acts as a hysteretic voltage regulator.

11. The switched-power circuit of claim 9, wherein the operating mode of the auxiliary power supply circuit is selected in conformity with a magnitude of the voltage at the intermediate node.

12. A method of controlling a cascaded power converter comprising a first switched-power circuit having an input coupled to a power source and an output coupled to an input of a second switched-power circuit, the method comprising:
providing a voltage from the power source to the input of the second switched-power circuit;
determining that an intermediate voltage at the input of the second switched power circuit is below a normal operating voltage or that the output of the cascaded power converter is effectively disabled by stopping normal switching operation of the second switched-power circuit as an indication that insufficient energy to operate control circuits of the cascaded power converter would be available from an auxiliary winding of a magnetic coupling element of the second switched-power circuit;
in response to the indication, operating the second switched-power circuit in a low energy transfer operating mode in which sufficient energy is transferred through the auxiliary winding to operate the control circuit; and
generating an auxiliary power supply output for operating at least one of the first switched-power circuit or the second switched-power circuit from a voltage across the auxiliary winding.

13. The method of claim 12, wherein during startup of the cascaded power converter, the control circuit operates the second switched-power circuit in the low energy transfer operating mode whereby the generating generates the auxiliary power supply output before the intermediate voltage has reached a steady-state value.

14. The method of claim 12, further comprising:
receiving an indication to disable the output of the cascaded power converter; and
in response to receiving the indication to disable the output of the cascaded power converter, performing the operating the second switched-power circuit in the low energy transfer operating mode, whereby the generating generates the auxiliary power supply output without generating substantial current at the output of the cascaded power converter.

15. The method of claim 12, wherein the operating the second switched-power circuit in the low energy transfer operating mode controls switching of the second switched-power circuit such that the second switched-power circuit has a first pulse repetition rate substantially lower than a second pulse repetition rate of the second switched-power circuit during a normal operating mode of the second switched-power circuit.

16. The method of claim 12, wherein the operating the second switched-power circuit in the low energy transfer operating mode, further controls switching of the second switched-power circuit such that the second switched-power circuit has a fixed narrowed pulse width substantially shorter than an operating pulse width of the second switched-power circuit during a normal operating mode of the second switched-power circuit.

17. The method of claim 15, wherein the second pulse repetition rate is greater than or equal to five times the first pulse repetition rate.

18. The method of claim 12, wherein the power source is an AC power source, wherein the first switched-power circuit is a power factor corrector, and wherein the second switched-power circuit is a DC-DC converter.

19. The method of claim 12, further comprising controlling the voltage at the auxiliary winding using an auxiliary power supply circuit having a selectable operating mode, wherein in a first operating mode of the auxiliary power supply circuit, a first voltage of the auxiliary power supply output is greater than a second voltage of the auxiliary power supply output in a second operating mode.

20. The method of claim 19, further comprising selecting an operating mode of the auxiliary power supply circuit in conformity with a magnitude of the output voltage, whereby the auxiliary power supply circuit hysteretically regulates the output voltage.

21. The method of claim 19, further comprising selecting an operating mode of the auxiliary power supply circuit in conformity with a magnitude of the intermediate voltage.

22. The method of claim 12, wherein the cascaded power converter is a power supply for supplying a light-emitting diode illuminator, and wherein the operating the second switched-power in the low energy transfer operating mode is performed during operation of the cascaded power converter in a dimming state.

23. An integrated circuit for controlling a cascaded power converter, comprising:
a first switch control circuit for operating a power factor converter that generates a DC voltage at an intermediate node from an AC power source; and
a second switch control circuit for operating a DC-DC converter having an input coupled to the intermediate node and an output providing an output of the cascaded power converter, wherein the DC-DC converter includes a magnetic coupling element for coupling the input of the DC-DC converter to the output of the cascaded power converter and having a primary winding and an auxiliary winding, wherein the second switch control circuit includes a controller that causes the DC-DC converter to operate in a low energy transfer operating mode when a voltage at the intermediate node is below a normal operating voltage or when the output of the cascaded power converter is effectively disabled by the controller circuit stopping normal switching operation of the DC-DC converter, wherein in the low energy transfer operating mode, energy sufficient to operate the controller is transferred to the auxiliary winding.

24. The integrated circuit of claim 23, wherein in the low energy transfer operating mode, the second switch control circuit has a first pulse repetition rate substantially lower than a second pulse repetition rate of the second switched-power circuit during ordinary operation of the second switched-power circuit.

25. The integrated circuit of claim 24, wherein in the low energy transfer operating mode, the second switch control circuit has a fixed narrowed pulse width substantially shorter than an operating pulse width of the DC-DC converter during ordinary operation of the DC-DC converter.

26. The integrated circuit of claim 24, wherein the second pulse repetition rate is greater than or equal to five times the first pulse repetition rate.

27. The integrated circuit of claim 23, further comprising an auxiliary power supply circuit having a selectable operating mode and having an input coupled to the auxiliary winding and an auxiliary power supply output for supplying power to the control circuit, wherein in a first operating mode of the auxiliary power supply circuit, a first voltage of the auxiliary power supply output is greater than a second voltage of the auxiliary power supply output when the auxiliary power supply circuit is in the second operating mode.

28. The integrated circuit of claim 23, wherein an operating mode of the auxiliary power supply circuit is selected in conformity with a magnitude of the output voltage, whereby the auxiliary power supply circuit acts as a hysteretic voltage regulator.

29. The integrated circuit of claim 23, wherein the cascaded power converter is a power supply for supplying a light-emitting diode illuminator, and wherein the second switch control circuit is operated in the low energy transfer operating mode during operation of the cascaded power converter in a dimming state.

30. A cascaded power converter, comprising:
multiple switching power stages coupled together in a cascade, wherein an input of a first one of the multiple switching power stages is provided from an input power source;
an auxiliary power supply having an input coupled to an auxiliary winding provided on a magnetic coupling element of a second one of the multiple switching power stages, wherein the input has an intermediate voltage; and
a control circuit for operating the second one of the multiple switching power stages in a low energy transfer operating mode having at least one of a pulse width or a switching rate substantially lower than another switching rate and another pulse width of a normal operating mode of the second one of the multiple switching power stages, and wherein the control circuit operates the cascaded power converter in the normal operating mode after the first one of the switching power stages has started and the intermediate voltage has reached a level sufficient to operate the second one of the switching power stages.

* * * * *